United States Patent
Björklund et al.

(10) Patent No.: US 8,305,782 B2
(45) Date of Patent: Nov. 6, 2012

(54) REDUNDANT CURRENT VALVE CONTROL IN A HIGH VOLTAGE POWER TRANSMISSION SYSTEM

(75) Inventors: Hans Björklund, Ludvika (SE); Krister Nyberg, Smedjebacken (SE)

(73) Assignee: ABB Technology AG, Zürich (CH)

( * ) Notice: Subject to any disclaimer, the term of this patent is extended or adjusted under 35 U.S.C. 154(b) by 466 days.

(21) Appl. No.: 12/600,326

(22) PCT Filed: May 12, 2008

(86) PCT No.: PCT/EP2008/055790
§ 371 (c)(1),
(2), (4) Date: Nov. 16, 2009

(87) PCT Pub. No.: WO2008/138911
PCT Pub. Date: Nov. 20, 2008

(65) Prior Publication Data
US 2010/0157633 A1    Jun. 24, 2010

Related U.S. Application Data

(60) Provisional application No. 60/924,414, filed on May 14, 2007.

(51) Int. Cl.
*H02H 7/10* (2006.01)
(52) U.S. Cl. .......................................... 363/51; 714/11
(58) Field of Classification Search .................. 363/51, 363/35; 714/11–13
See application file for complete search history.

(56) References Cited

U.S. PATENT DOCUMENTS

| | | | |
|---|---|---|---|
| 3,609,510 A * | 9/1971 | Berkovsky et al. | 363/13 |
| 4,974,150 A | 11/1990 | Long | |
| 5,285,381 A * | 2/1994 | Iskarous et al. | 700/82 |
| 5,958,069 A * | 9/1999 | Kawasaki et al. | 714/11 |
| 2003/0120716 A1 | 6/2003 | McClellan et al. | |
| 2005/0047391 A1 | 3/2005 | Tuxen | |
| 2005/0135421 A1 | 6/2005 | Chang et al. | |

FOREIGN PATENT DOCUMENTS
EP    1659465 A2    5/2006
(Continued)

OTHER PUBLICATIONS

Bengt Jansson et al; "Kontek HVDC Interconnection"; IEE, 1996; pp. 118-123.

(Continued)

*Primary Examiner* — Harry Behm
(74) *Attorney, Agent, or Firm* — Venable LLP; Eric J. Franklin

(57) ABSTRACT

A method and device for providing redundant control of a controllable current valve in a converter of a power transmission system. A first converter control unit sends a first valve control signal. A first active/standby indicator is associated with the first converter. A second converter control unit sends a second valve control signal. A second active/standby indicator is associated with the second converter control unit. The device also includes a valve control unit. An active/standby indicator indicates if a corresponding converter control unit is active or standby. Only one indicator indicates an active unit at a given point in time. The valve control unit receives the active/standby indicators and valve control signals, selects a valve control signal to be applied if the corresponding active/standby indicator indicates an active converter control unit and controls the current valve using the selected valve control signal.

14 Claims, 3 Drawing Sheets

FOREIGN PATENT DOCUMENTS

| | | |
|---|---|---|
| EP | 1708445 A1 | 10/2006 |
| GB | 2426165 A | 11/2006 |
| WO | WO-2006/128400 A1 | 12/2006 |
| WO | WO-2008/036303 A2 | 3/2008 |

OTHER PUBLICATIONS

B. Nicol et al.; "Win-TDC* The State-of-the-Art Control and Protection System for HVDC Applications"; IEEE; 2005; pp. 1-5.

Leandro Bertoni et al.; "MACH2—Modular Advanced Control 2nd Edition"; IEEE; 2004; pp. 1-6.

Jim Y. Cai et al.; "Current Status and Experience of WAMS Implementation in North America"; IEEE; 2005; pp. 1-7.

J. D. Ainsworth; "Telecommunication for h.v.d.c. control"; GEC Journal of Science & Technology, vol. 48, No. 3, 1982; pp. 159-162.

Yue Yuan et al.; "A Real-time Monitoring Method for Power System Steady State Angle Stability based on WAMA"; IEEE; 2005; pp. 1-4.

IEEE Standard for Synchrophasors for Power Systems; Mar. 22, 2006; 4 pages, 64 pages.

M. Davies; "Latest Control and Protection Innovations Applied to the Basslink HVDC Interconnector"; IEE; 2006; pp. 30-35.

Frik Venter et al.; "A Distributed Sequential Control for the Apollo HVDC Substation"; IEEE; 2006; pp. 879-873, 1996, pp. 869-873.

\* cited by examiner

REDUNDANT CURRENT VALVE CONTROL IN A HIGH VOLTAGE POWER TRANSMISSION SYSTEM

CROSS-REFERENCE TO RELATED APPLICATIONS

This application claims priority to U.S. provisional patent application 60/924,414 filed 14 May 2007 is the national phase under 35 U.S.C. §371 of PCT/EP2008/055790 filed 12 May 2008.

FIELD OF INVENTION

The present invention relates to a method and device for providing redundant control of at least one controllable current valve provided in a converter of a high voltage power transmission system.

BACKGROUND

In high-voltage power transmission systems there is a frequent use of current valves when converting AC power to DC power or vice versa. These current valves are furthermore often controlled in a closed loop.

Power transmission systems do have to be reliable. It is important to limit possible faults as much as possible. Because of this the control of the current valves in these systems, which is performed through a converter control device, does in many cases have to be redundant. In known redundant systems, there are provided two parallel converter control devices, where one can take over control when there is a fault in the other. These converter control devices are then arranged in an Active/Stand By configuration using a separate switch-over logic circuit.

An example of this type of solution is described by Bertoni et al in "MACH-2 Modular Advanced Control 2$^{nd}$ Edition, Transmission and Distribution Conference and Exposition: Latin America, 2004 IEEE/PES. 8-11 Nov. 2004, page 884-889.

The normal way to provide such switch-over is thus through providing a separate switch over logic circuit, with which the two converter control units communicate, using for instance hand-shaking. Such a switch-over logic circuit should furthermore allow the continuous operation of the current valves in the power transmission system also during the switch-over. This is not so easy to do when this switch-over logic circuit is in the process of deciding to switch over during closed-loop control.

Moreover, if also this switch-over logic circuit becomes faulty, the system will have to be shut down if the switch-over logic circuit is to be repaired or replaced, which is highly undesirable.

Therefore, there is a need for providing redundant control of at least one current valve in a power transmission system, where the use of a separate switch-over logic circuit can be avoided.

In view of what has been described above there is therefore a need for providing a different way to determine the change in insulating ability, which considers also the cause of the changes.

SUMMARY OF THE INVENTION

One object of the present invention is to provide a method for providing redundant control of at least one controllable current valve provided in a converter of a high voltage power transmission system, which method can be performed without the use of a separate switch-over logic circuit.

This object is according to a first aspect of the present invention solved through a method for providing redundant control of at least one controllable current valve provided in a converter of a high voltage power transmission system, and comprising the steps of:

sending a first valve control signal for the valve and an associated first active/standby indicator from a first converter control unit to a valve control unit, sending a second valve control signal for the valve and an associated second active/standby indicator from a second converter control unit to the valve control unit, where an active/standby indicator indicates if a corresponding converter control unit is an active or standby converter control unit and only one active/standby indicator indicates an active converter control unit at a given point in time, receiving, by the valve control unit, the active/standby indicators as well as the first and second valve control signals, selecting, by the valve control unit, a valve control signal to be used for controlling the current valve if the associated active/standby indicator indicates an active converter control unit, and controlling the current valve using the selected valve control signal.

Another object of the present invention is to provide a device for providing redundant control of at least one controllable current valve provided in a converter of a high voltage power transmission system, where the use of a separate switch-over logic circuit can be avoided.

This object is according to a second aspect of the present invention solved through a device providing redundant control of at least one controllable current valve provided in a converter of a high voltage power transmission system, and comprising a first converter control unit arranged to send a first valve control signal for the valve and an associated first active/standby indicator, a second converter control unit arranged to send a second valve control signal for the valve and an associated second active/standby indicator, where an active/standby indicator indicates if a corresponding converter control unit is an active or standby converter control unit and only one active/standby indicator indicates an active converter control unit at a given point in time, a valve control unit arranged to
  receive the active/standby indicators as well as the first and second valve control signals,
  select a valve control signal to be applied for controlling the current valve if the corresponding active/standby indicator indicates an active converter control unit, and
  control the current valve using the selected valve control signal.

According to one variation of the present invention one determination is made if the first valve control signal is to be applied based on the first active/standby indicator, and one determination is made if the second valve control signal is to be applied based on the second active/standby indicator.

These determinations are furthermore performed in parallel, independently of each other.

The present invention has a number of advantages. It allows fast change-over to be performed. It furthermore does not need to use any separate switch-over logic circuit, which is an additional source for possible faults. Through the removal of such a logic circuit it is furthermore possible to replace most parts of the device of the present invention if they become faulty also when the power transmission system is up and running. Thus the reliability of the system is increased.

BRIEF DESCRIPTION OF THE DRAWINGS

The present invention will in the following be described with reference being made to the accompanying drawings, where FIG. 1 schematically shows a power transmission system including converters having current valves in which system the principles of the present invention may be applied, FIG. 2 schematically shows a device for providing redundant control of current valves and including two converter control units being connected to a valve control unit controlling current valves in a converter, FIG. 3 schematically shows a number of method steps being taken by the two converter control units in a method according to the present invention, FIG. 4 schematically shows a number of method steps being taken by the valve control unit in a method according to the present invention.

DETAILED DESCRIPTION OF THE INVENTION

In the following, a detailed description of preferred embodiments of a device and a method according to the present invention will be given.

Figure 1:
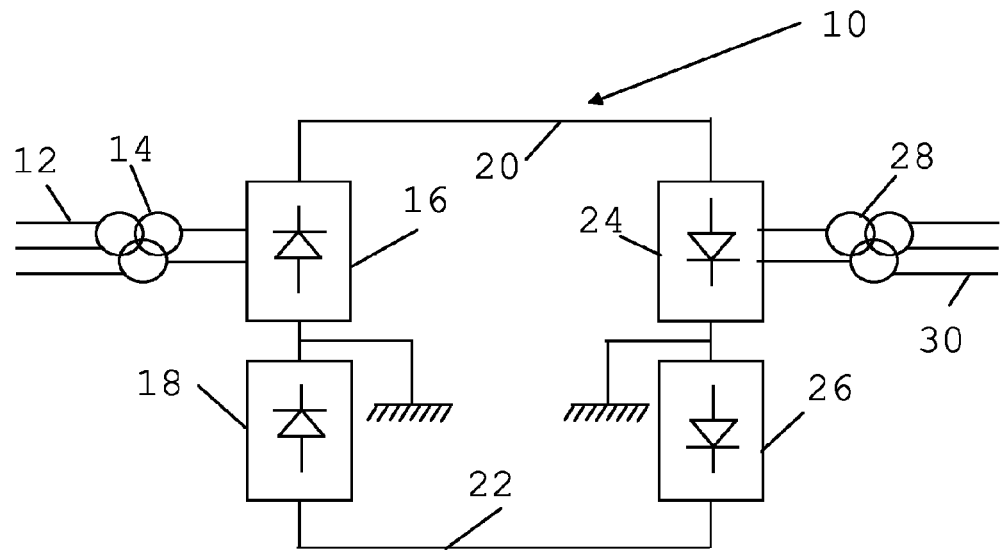

In FIG. 1 there is schematically shown a high-voltage power transmission system 10 in which the principles of the present invention may be applied. The power transmission system is in the example given in FIG. 1 a HVDC (High Voltage Direct Current) power transmission system. It should be realized that the present invention is not limited to such a system, but may be used in other types of high-voltage power transmission systems, such as for instance FACTS (Flexible Alternating Current Transmission System).

In the figure there is a first AC power line 12, which is here a three-phase power line, which leads to a first transformer 14. The first transformer 14 is connected to a first converter 16, which converts the AC voltage to a DC voltage. This first converter 16 is in turn connected to a first DC power line 20, which in turn leads to a second converter 24, which is a converter converting DC power to AC power. The second converter 24 is in turn connected to a second transformer 28. The second transformer is in turn connected to a second AC power line 30, which is also here a three-phase power line. The first and second converters 16 and 24 are furthermore connected to ground and is also each connected, at these ground connections, to a corresponding third and fourth converter 18 and 26, which are in turn connected to a second DC power line 22. The third converter 18 is here of the same type as the first converter 16, while the fourth converter 26 is of the same type as the second converter 24. In case of FIG. 1, the DC power lines 20 and 22 form a DC link of at least several kilometers length in order to be used to transmit power at reduced losses over a considerable distance. But it is also possible to use the same configuration of FIG. 1 to interconnect two AC power lines with for example different AC frequencies at one and the same location.

The system shown in FIG. 1 is a so-called bipole system, where the first DC power line 20 is provided at a first positive voltage and the second DC power line 22 is provided at a second opposite negative voltage. This means that there is a forward current path provided by the first DC power line 20 and a return current path provided by the second DC power line 22. However, it should be realized that it is possible to provide a monopole system instead through removing the return path provided by the second DC power line 22 and removing the third and fourth converters 18 and 26. In a monopole system the first and second converters 16 and 24 would instead only be connected between the first DC power line and ground. In this case a return path may be provided via ground.

The design and operation of the converters described above is well known and does not form a part of the present invention. However, these converters include current valves. How to switch over to redundant control of these valves is on the other hand central to the present invention.

Each converter includes a number of current valves. The current valves used may with advantage be thyristors. However, it should be realized that the current valves used may be other types of controllable electrical components, such as transistors, for instance IGBT (Insulated Gate Bipolar Transistor) transistors and MOSFET transistors as well as other types of valves such as GTOs (Gate Turn-Off Thyristor) and mercury arc valves. In the drawing only one such valve is schematically shown in each converter. However there may, and normally are, several such valves in various configurations, for instance in the form of a rectifying bridge in the case of the first and third converters 16 and 18 and in the form of an inverter in the case of the second and fourth converters 24 and 26. Such configurations may furthermore include several current valves connected in series with each other, because of the high voltages being used.

In order to operate properly the current valves have to be controlled. Such control is not shown in FIG. 1.

In power transmission systems this control must be safe, which means that the power transmission system should be up and running as much as possible. This is in many power transmission systems solved through redundancy, i.e. there are provided redundant control devices controlling the converters.

Figure 2:
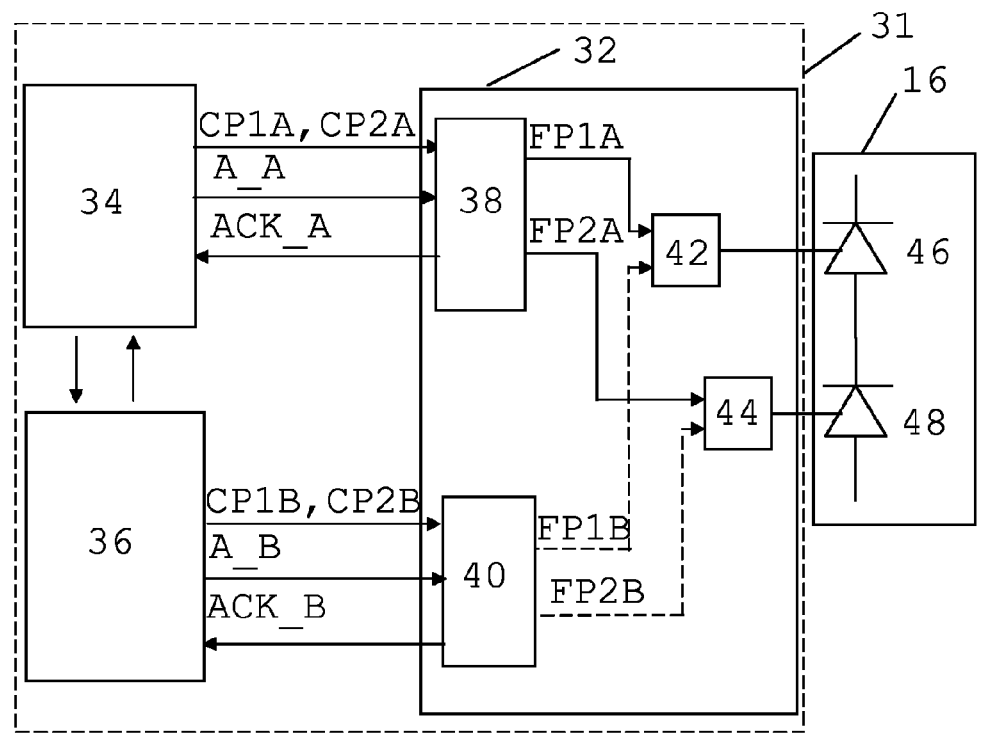

A simplified device for providing redundant control of at least one controllable current valve provided in a converter according to the present invention is shown in a block schematic in FIG. 2. This device 31 will in the following be termed a redundant control device. It is used for controlling a number of current valves in a converter.

The device 31, which is shown as a dashed box, includes a first converter control unit 34 and a second converter control unit 36, which are both connected to a local valve control unit 32 for controlling a number of current valves 46 and 48 in a converter, here the first converter 16. Normally there are several such valve control units connected to both converter control units, where each valve control unit may control several current valves, for instance 12. However, each may also control as little as one valve. In order to simplify the description of the present invention there is here only shown one such valve control unit 32 and this valve control unit 32 is shown as controlling two valves 46 and 48. A valve control unit is sometimes also called Valve Base Electronics and can be seen as a fast remote I/O between the converter control units and the valves. A converter control unit here delivers valve control signals, here also denoted control pulses CP because these signals are in the present example provided as pulses, the length of which indicates how long a valve is to be open. It is however clear that other ways of providing this information can be provided. A control pulse thus indicates when and for how long a current valve controlled by the valve control unit is to be open. The valve control unit may then convert these valve control signals to valve driving signals, i.e. signals that are applied to the valves for opening and closing them. These valve driving signals are here also denoted firing pulses FP, because they are in the present example used for firing thyristors. As is well known in the art these pulses may be much shorter than the control pulses. A converter control unit here furthermore performs closed-loop control of the current valves in a converter.

According to the present invention, a first converter control unit 34 is more particularly connected to a first local valve control element 38 of the valve control unit 32 and a second converter control unit 36 is connected to a second local valve control element 40 of the local valve control unit 32. The valve control elements 38 and 40 are driving stages for the valves and provide driving signals, here firing pulses, based on the control signals. The first and second converter control units 34 and 36 are furthermore able to communicate with each other in order to hand over control from one to the other. This communicating ability is in FIG. 2 indicated by vertical arrows. Both the first and second local valve control elements 38 and 40 are furthermore connected to a first and second conversion stage 42 and 44 that converts the driving pulses from electrical to optical pulses. The conversion stages could here be provided in the form of optical devices that transfer optical firing pulses to the current valves, where the current may itself be provided with optical electrical conversion means or an optical/electrical converter be provided at the current valve. This is well known within the field and no real part of the present invention. Each valve control element of the valve control unit is furthermore arranged to process signals from a corresponding converter control unit in the same way. They thus have identical configuration and operation.

Figure 3:
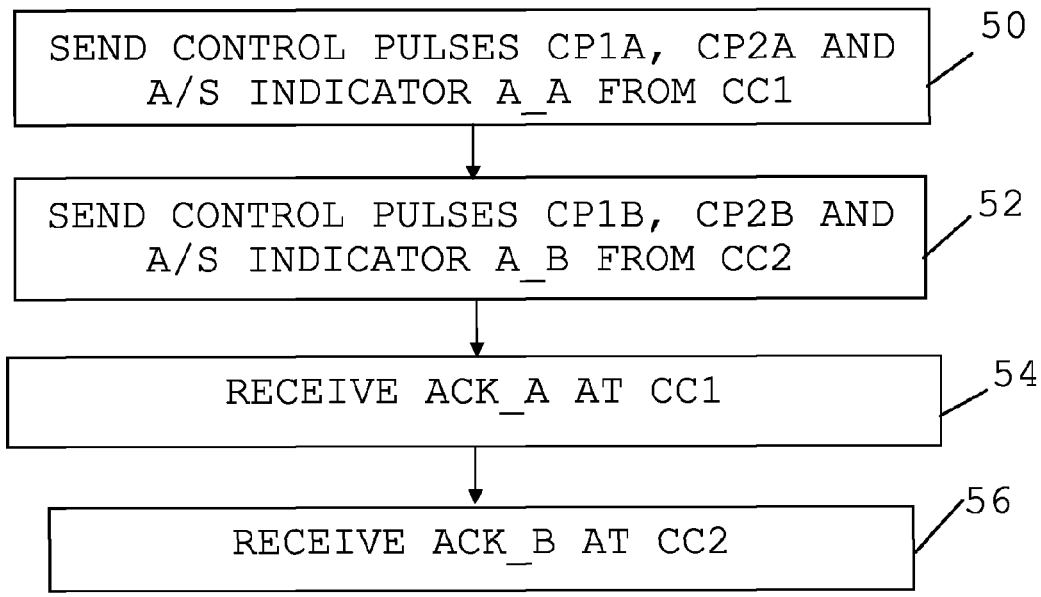
Figure 4:
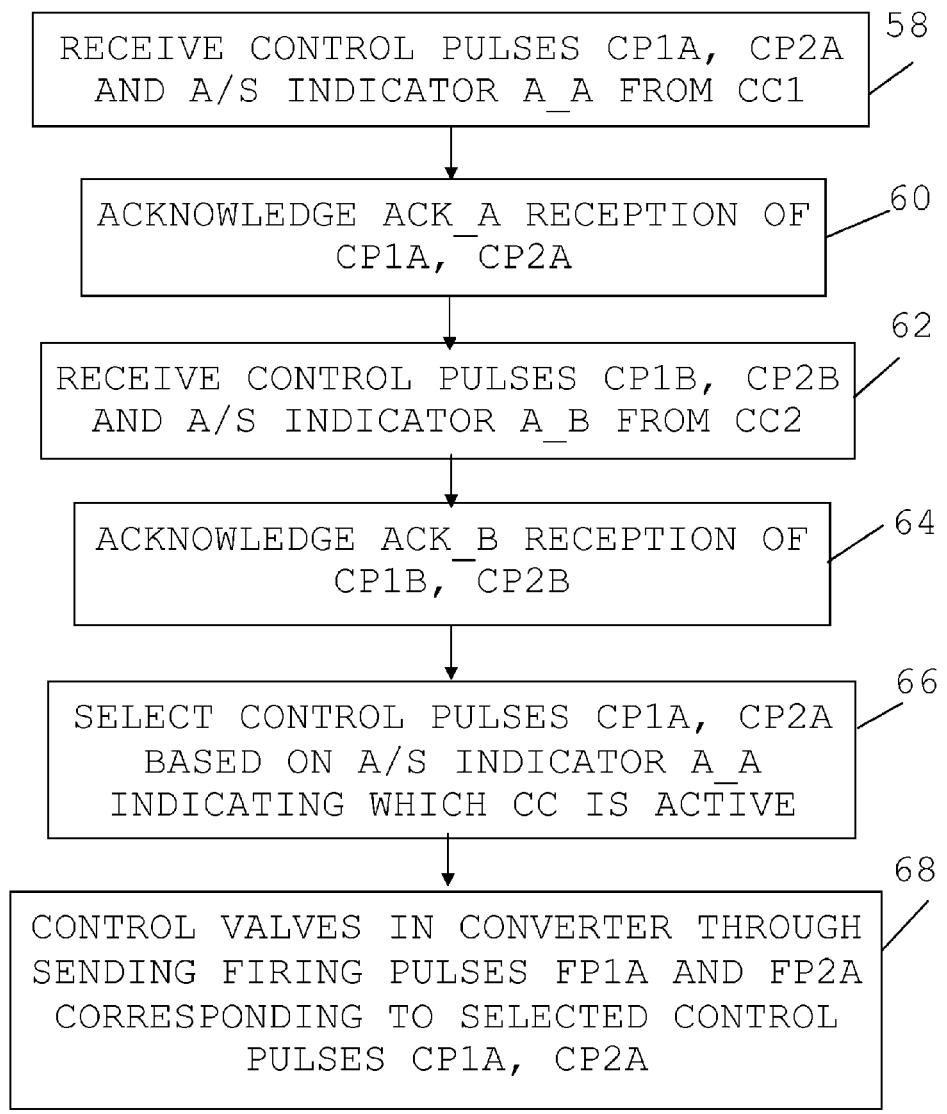

The functioning of the present invention will now be described with reference being made to FIGS. 1 and 2 as well as with reference being made to FIGS. 3 and 4, where FIG. 3 schematically shows a number of method steps being taken by the two converter control units in a method according to the present invention and FIG. 4 schematically shows a number of method steps being taken by the valve control unit in a method according to the present invention.

The two converter control units 34 and 36, which may include functionality such as Bipole Control, Pole Control and Converter Control are designed as duplicated units acting as active and hot standby. At any time only one of the two units is active, controlling the converter and associated equipment. The other system, the standby system, is running, but the "outputs" from that system are disabled. This means that both are acting as if they were controlling the valves, but the valves are actually only controlled by one of them. Their operation is furthermore independent from each other. They should also be operating identically in case of no fault. Should a fault be detected in the active system, the standby system will take over the control, becoming the new active system. Such taking over is performed through handshaking between the two converter control units 34 and 36. Handshaking may here be performed via two full duplex optical communication links, which provides a high security since one link may fail without impacting the handshaking. Alternatively the handshaking may be performed via two redundant LAN networks on the pole level that link the control systems on the pole together.

In the example of FIG. 2 the first converter control unit 34 is the active control unit, while the second converter control unit 36 is the standby control unit. According to the present invention the first converter control unit 34 sends a first valve control signal for each valve to be controlled, here in the form of control pulses CP1A and CP2A for the valves 46 and 48, and an associated first active/standby indicator A_A to the first local valve control element 38 of the valve control unit 32, step 50. In one embodiment of the present invention there is a control pulse indicating how long a certain valve is to be open and when. There is then one such pulse for each valve being controlled by the local valve control unit. The control pulses may here be continuously sent 120°-Control Pulses (CP). The first active/standby indicator A_A is here a separate signal, which indicates that the first converter control unit 34 is an active unit, i.e. the one which is to control the valves 46 and 48. This may be done through the signal A_A having a certain voltage level.

Also the second converter control unit 36 sends a second valve control signal for each valve to be controlled, here in the form of control pulses CP1B and CP2B, together with an associated second active/standby indicator A_B to the second local valve control element 40 of the valve control unit 32, step 52. The control pulses should here be identical to the first control pulses if there is no fault. However, the active/standby indicator A_B here indicates that the converter control unit is a standby unit. This may be indicated through the second active/standby indicator A_B having another voltage level than the first active/standby indicator A_A, for instance a zero voltage.

These signals are furthermore here sent directly and in parallel from the converter control units to the valve control unit 32. Only one of the active/standby indicators further indicate an active converter control unit at a given point in time, that is the two active/standby indicators cannot simultaneously indicate an active converter control unit.

The first valve control element 38 thus receives the control pulses CP1A, CP2A and the active/standby indicator A_A from the first converter control unit 34, step 58. In the present example it acknowledges the reception through returning an acknowledgement signal ACK_A to the first converter control unit, step 60. This acknowledgement may be provided through returning the control pulses CP1A and CP2A. The second valve control element 40 also receives the control pulses CP1B, CP2B and the active/standby indicator A_B from the second converter control unit 36, step 62, and acknowledges ACK_B the reception in the same way as the first valve control element 38, step 64.

The valve control unit 32 then selects which control pulses CP1A, CP2A or CP1B, CP2B are to be used for controlling the valves 46 and 48, i.e. for firing the thyristors, step 66, which selection is made based on which active/standby indicator indicates an active converter control unit. A control pulse is here selected if the corresponding active/standby indicator indicates an active converter control unit. Each valve control element here determines if the control pulses it receives are to be applied based on the corresponding active/standby indicator. These determinations are furthermore performed in parallel independently of each other in the two valve control elements 38 and 40. Such a determination may be done through each valve control element logically combining the control pulses with the active/standby indicator, for instance using an OR operation. Here it should be realized that there may exist many other ways in which such a logical combining may be made.

The valve control element that has received an active/standby indicator indicating an active converter control unit here converts the received control pulses to firing pulses, while the other valve control element does not because the active/standby indicator that it has received indicates a standby converter control unit. Here the first valve control element 38 received an active/standby indicator A_A indicating that the first converter control unit 34 is active and therefore it controls the valves 46, 48 in the converter 16 through sending firing pulses FP1A and FP2A that correspond to the selected control pulses CP1A, CP2A, step 68. The control pulses may in more detail be converted to 1 μs Firing Pulses (FP) for firing of the valves. Should a valve extinguish during the control pulse interval a new firing pulse FP may immediately be generated for re-firing of the valve.

The active valve control element 38 then sends the firing pulses corresponding to the selected control pulses to the converters 42 and 44 in order to be transferred to the current valves 46 and 48. In the example given in FIG. 3, the first valve control element 38 emits firing pulses FP1A, FP2A, while the second valve control element 40 does not. This is in FIG. 2 indicated through the firing pulses FP1A, FP2A being provided from the first valve control element 38 being shown with solid arrows, while firing pulses FP1B, FP2B from the second valve control element 40 are shown with dashed arrows.

A switch from one converter control unit to the other can be manually or automatically.

The manual commands may be initiated by a "push button" in the active converter control unit. When this button is pressed on the active converter control unit handshaking is initiated between the two converter control units in order to determine a point in time when control is to be handed over, i.e. when the units simultaneously change state for their corresponding active/standby indicators. Changing state for these active/standby indicators means that the one that indicated an active converter control unit now indicates a standby converter control unit and vice versa.

Automatic switch-over may be initiated through the converter control units both supervising their own functionality in order to detect possible faults. The switchover commands are preferably initiated from the currently active converter control unit. By this switch over philosophy, a fault or testing activity in the standby unit cannot result in an unintentional switch over. Furthermore a manual switch over order to a faulty standby system is not possible.

The internal supervisions giving switch over orders includes:
Supervision of measuring systems (e.g. DCCT, DCOCT)
Supervision of data bus communications
Supervision of μ-computer program execution
Memory test of μ-computers
Supervision of auxiliary power The active converter control unit here initiates handing over in case that faults are detected in the supervised functionality.

It is here also possible to monitor the acknowledgement received from a valve control element. This can be used to indicate that the valve control element is faulty, which can also cause a switchover command to be generated.

The active converter control unit then hands over control to the standby converter control unit through handshaking in the previously described way. The faulty system (the previously active system) should thereafter be checked before being taken into operation again, now as a standby system.

According to the present invention it is furthermore possible to initiate a handing over through the use of a system protection unit.

This will now be described in relation to FIG. 5, which shows a block schematic of the redundant control device of the present invention including a system protection unit.

Figure 5:
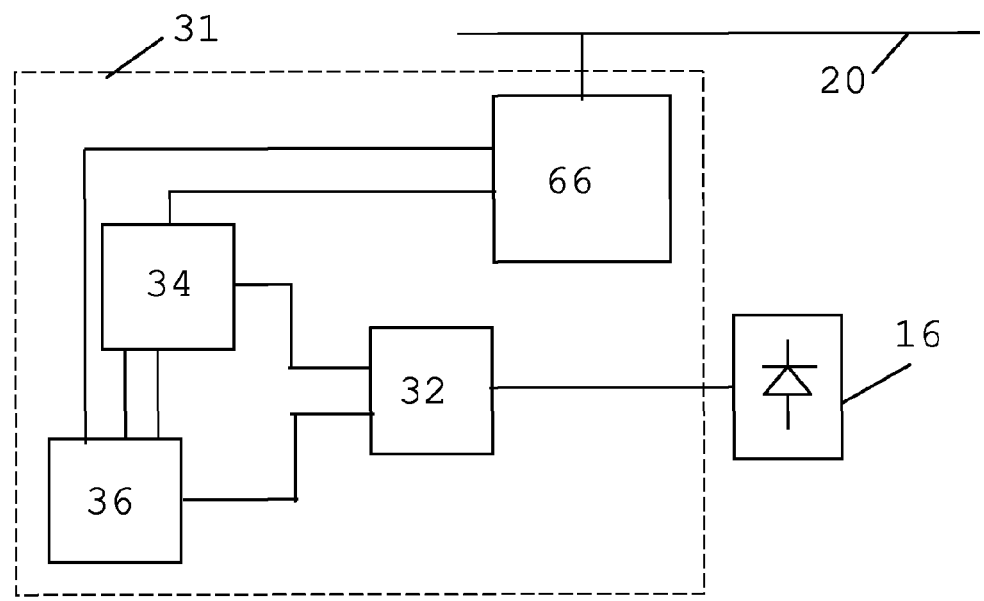
FIG. 5, shows a block schematic of the device of the present invention including a system protection unit.

In FIG. 5 there is a system protection unit 66, which is connected to a part of the system, here the first DC power line 20, as well as to the first and second converter control units 34 and 36. These are connected to each other as well as to the valve control unit 32, which in turn is connected to the converter 16 for controlling valves.

The system protection unit 66 here monitors at least one operating condition of the system, which may be the current running through the power line 20, the voltage of the power line or the transferred power. It should here be realized that it might monitor other parts like for instance transformers. The monitored operating condition, like for instance the current may reach a risk state, which in the case of the current is typically a current that is above a first current threshold. The system protection unit 66 would in case this risk state is reached then typically perform some type of safety measure like tripping the current through opening a breaker or issue blocking orders. According to the present invention the system protection unit 66 orders the active converter control unit to hand over control to the standby converter control unit with a short pick up delay if the monitored operating condition is in proximity of the risk state, i.e. is close to this state but not quite there. In the example of the current this may be that the current has exceeded a second threshold, which is provided below the first threshold. Handover is then again performed in the previously described way through handshaking between the two converter control units. In case the current despite this action would reach the risk state, the safety protection unit 66 may perform the safety measure for this type of risk, for instance trip the current.

The present invention has a number of advantages. The use of active/standby indicators allows the actual switch-over from a converter control unit to another to be made fast as soon as the handshaking has been performed. Fast change-over may be performed within 1 μs. This is especially important in closed-loop control systems.

Through the separate treatment of the independently generated valve control signals based on the active/standby indicators it is furthermore possible to provide parallel redundancy all the way from the converter control units to the point in the valve control unit where the valve actuating signals are converted, i.e. at the electro-optical converters transmitting signals to the separate current valves. There is thus a complete isolation between the redundant systems up to this point in order to make sure that a faulty standby system will not interfere with the operation of the active system. This also means that there are no common parts involved with selecting redundant valve control. Through this measure the need for a separate switch-over logic circuit is thus removed. This means that all the parts up to the above-mentioned converters, including the valve control elements, may be replaced if they become faulty. They may then also be replaced when the power transmission system is up and running. This is not possible to do if there is a common switchover logic circuit.

However it should be known that also faulty current valves and/or faulty electro-optical converters may be replaced, since there is often a serial redundancy, i.e. there are more current valves connected in series than what is required by the system. A faulty thyristor may furthermore be detected through using the indication pulses sent from the individual thyristor positions of the valves as they pick up positive voltage.

The use of acknowledgements also simplifies the locating of a faulty valve control element, which may also be replaced in an active system after transfer of control to the standby system.

Through having a protective unit initiate a handover of control to a redundant converter control unit before a protective action is performed it is furthermore ensured that possibly undetected faults in the active control does not cause a protective action to be performed, but instead that the redundant control takes over. This provides a further enhancement of the reliability of the operation of the power transmission system. At the same time the protective action will be performed in case a risk state is actually reached. In this way the protective unit will detect abnormal operating conditions of the system. Should the abnormal condition be caused by a control fault, a switch over could thus restore the normal operating condition. This will also guard against failures in the measuring circuitry. This increases an already high reliability of the duplicated systems even further.

The converter control units according to the present invention may be provided through one or more processors with corresponding program code including program instructions for performing its functions. This code may in fact be provided in the form of a computer program product comprising computer program code provided on a computer readable medium, such on a CD ROM or other type of storage medium, and being configured to make a converter control unit perform, when the code is loaded into the converter control unit, the functionality described above in relation to a converter control unit. The valve control elements of the valve control unit may be implemented through a suitable combination of logic circuits, like AND-, OR-, NOR- and XOR-circuits possibly together with amplifiers and the electro-optical converters of the valve control unit may be provided through IR diodes.

The present invention may be varied in a number of ways, apart from those already mentioned.

The active/standby indicator was above described as being provided separately from the valve control signals. It should here be realized that it may be combined with the valve control signals, for instance through being modulated onto one or more of them. These valve control signals for several valves may furthermore be combined into a single signal or provided as several parallel signals.

It should also be realized that the above described ways of handing over control from one converter control unit to another are just a few and that many others may be used. From the foregoing discussion it is evident that the present invention can be varied in a multitude of ways. It shall consequently be realized that the present invention is only to be limited by the following claims.

The invention claimed is:

1. A method for providing redundant control of at least one controllable current valve provided in a converter of a high voltage power transmission system, the method comprising:
sending a first valve control signal for said at least one controllable valve and an associated first active/standby indicator from a first converter control unit to a first valve control element of a valve control unit,
sending a second valve control signal for said at least one controllable valve and an associated second active/standby indicator from a second control element of said valve control unit, wherein an active/standby indicator indicates if a corresponding converter control unit is an active or standby converter control unit and only one active/standby indicator indicates an active converter control unit at a given point in time, such that two active/standby indicators cannot simultaneously indicate an active converter control unit,
receiving, with said valve control unit, said active/standby indicators and said first and second valve control signals,
selecting, with said valve control unit, a valve control signal to be used for controlling said current valve if the associated active/standby indicator indicates an active converter control unit, wherein the selecting comprises
determining by the first valve control element if said first valve control signal is to be applied based on the first active/standby indicator, and
determining by the second valve control element if said second valve control signal is to be applied based on the second active/standby indicator,
wherein the determinations are performed in parallel independently of each other and
controlling said current valve using said selected valve control signal.

2. The method according to claim 1, wherein the controlling comprises converting the valve control signal that is associated with an active/standby indicator indicating an active converter control unit to a valve driving signal, and applying said valve driving signal to said valve.

3. The method according to claim 1, further comprising:
returning, with the valve control unit, an acknowledgement of each received converter control signal to the corresponding converter control unit through returning said received valve control signal.

4. The method according to claim 1, further comprising:
supervising, with each converter control unit, a functionality and a handing over of each converter control unit, with the active converter control unit, control to the standby converter control unit in case faults are detected in the supervised functionality.

5. The method according to claim 4, wherein the handing over control is performed using handshaking.

6. The method according to claim 1, further comprising:
monitoring, with a system protection unit, at least one operating condition of the system, providing, by said system protection unit, a system safety measure in case the operating condition reaches a risk state and ordering, with the system protection unit, the active converter control unit to handover control to the standby converter control unit if the monitored operating condition is in proximity of the risk state.

7. The method according to claim 1, wherein the high voltage power transmission system is a DC power transmission system.

8. The method according to claim 1, wherein the high voltage power transmission system is operating at voltages around 800 kV.

9. A device for providing redundant control of at least one controllable current valve provided in a converter of a high voltage power transmission system, the device comprising:
a first converter control unit arranged to send a first valve control signal for said at least one controllable valve and an associated first active/standby indicator,
a second converter control unit arranged to send a second valve control signal for said at least one controllable valve and an associated second active/standby indicator, wherein an active/standby indicator indicates if a corresponding converter control unit is an active or standby converter control unit and only one active/standby indicator indicates an active converter control unit at a given point in time, such that two active/standby indicators cannot simultaneously indicate an active converter control unit, and
a valve control unit comprising
a first valve control element arranged to receive said first valve control signal from said first converter control unit, receive said first active/standby indicator and to determine if said first valve control signal is to be applied based on the first active/standby indicator, and a second valve control element arranged to receive said second valve control signal, receive said second active/standby indicator and to determine if said second valve control signal is to be applied based on the second active/standby indicator, wherein the first and second valve control elements are arranged to perform said determinations in parallel independently of each other, wherein the valve control unit is arranged to receive said active/standby indicators and said first and second valve control signals, select a valve control signal to be applied for controlling said current valve if the corresponding active/standby indicator indicates an active converter control unit, and control said current valve using said selected valve control signal.

10. The device according to claim 9, wherein the valve control element which has received an active/standby indicator indicating an active converter control unit is further arranged to convert the corresponding valve control signal to a valve driving signal to be applied to said at least one controllable valve.

11. The device according to claim 9, wherein each valve control element is arranged to return an acknowledgement to the corresponding converter control unit through returning said received valve control signal.

12. The device according to claim 9, wherein each converter control unit is arranged to supervise its own functionality and the active converter control unit is further arranged to handover control to the standby converter control unit in case faults are detected in the supervised functionality.

13. The device according to claim 12, wherein the active converter control unit is arranged to handover control to the standby converter control unit through handshaking.

14. The device according to claim 9, further comprising:

a system protection unit arranged to monitor at least one operating condition of the system and to provide a system safety measure in case the operating condition reaches a risk state, wherein the system protection unit is further arranged to order the active converter control unit to handover control to the standby converter control unit if the monitored operating condition is in proximity of the risk state.

* * * * *